United States Patent
Choi et al.

(10) Patent No.: US 10,226,757 B2
(45) Date of Patent: Mar. 12, 2019

(54) METHOD FOR SURFACE-MODIFYING METAL SILICIDE, AND METHOD AND APPARATUS FOR PREPARING TRICHLOROSILANE USING SURFACE-MODIFIED METAL SILICIDE

(71) Applicants: KOREA RESEARCH INSTITUTE OF CHEMICAL TECHNOLOGY, Daejeon (KR); HANWHA CHEMICAL CORPORATION, Seoul (KR)

(72) Inventors: Won Choon Choi, Daejeon (KR); Yong Ki Park, Seoul (KR); Woo Hyung Lee, Chungcheongbuk-do (KR); Hwi Min Seo, Daejeon (KR); Na Young Kang, Daejeon (KR); Joo Hee Han, Daejeon (KR); Dong Ho Lee, Daejeon (KR); Gui Ryong Ahn, Daejeon (KR); Gil Ho Kim, Daejeon (KR)

(73) Assignee: KOREA RESEARCH INSTITUTE OF CHEMICAL TECHNOLOGY, Yuseong-Gu, Daejeon (KR)

( * ) Notice: Subject to any disclaimer, the term of this patent is extended or adjusted under 35 U.S.C. 154(b) by 116 days.

(21) Appl. No.: 15/110,229

(22) PCT Filed: Jan. 19, 2015

(86) PCT No.: PCT/KR2015/000518
§ 371 (c)(1),
(2) Date: Jul. 7, 2016

(87) PCT Pub. No.: WO2015/111885
PCT Pub. Date: Jul. 30, 2015

(65) Prior Publication Data
US 2016/0332149 A1    Nov. 17, 2016

(30) Foreign Application Priority Data
Jan. 23, 2014 (KR) .......................... 10-2014-0008338

(51) Int. Cl.
*B01J 23/755* (2006.01)
*B01J 10/00* (2006.01)
(Continued)

(52) U.S. Cl.
CPC ............. *B01J 23/755* (2013.01); *B01J 4/002* (2013.01); *B01J 10/007* (2013.01); *B01J 21/06* (2013.01);
(Continued)

(58) Field of Classification Search
CPC ............... B01J 2523/41; B01J 2523/17; B01J 2523/847; B01J 23/72; B01J 23/755; C01B 33/06; C01B 33/1071; C01B 33/10763
See application file for complete search history.

(56) References Cited

U.S. PATENT DOCUMENTS 4,526,769 A * 7/1985 Ingle .................. C01B 33/1071
423/342
5,716,590 A * 2/1998 Roewer .................... A62D 3/37
423/342

(Continued)

FOREIGN PATENT DOCUMENTS

JP       3708648      8/2005
JP       2013537162   9/2013

(Continued)

OTHER PUBLICATIONS

International Search Report cited in PCT Application No. PCT/KR2015/000518 dated Apr. 10, 2015.

*Primary Examiner* — Ngoc-yen Nguyen
(74) *Attorney, Agent, or Firm* — Workman Nydegger (57) ABSTRACT

A method for preparing trichlorosilane according to an embodiment of the present invention comprises the steps of: supplying surface-modified metal silicide and metal grade
(Continued)

silicon to a reaction unit; supplying silicon tetrachloride and hydrogen to the reaction unit; and supplying a product, which is generated by a reaction of metal grade silicon, silicon tetrachloride, and hydrogen in the presence of metal silicide in the reaction unit, to a separation unit, and separating a trichlorosilane component. In cases where a silicon tetrachloride hydrochlorination reaction is performed using the method for preparing trichlorosilane according to the embodiment of the present invention, the yield of trichlorosilane can be raised.

13 Claims, 3 Drawing Sheets

(51) Int. Cl.
*B01J 37/02* (2006.01)
*B01J 23/72* (2006.01)
*B01J 35/02* (2006.01)
*C01B 33/107* (2006.01)
*B01J 4/00* (2006.01)
*C01B 33/06* (2006.01)
*B01J 21/06* (2006.01)

(52) U.S. Cl.
CPC ............ *B01J 23/72* (2013.01); *B01J 35/026* (2013.01); *B01J 37/0209* (2013.01); *C01B 33/06* (2013.01); *C01B 33/1071* (2013.01); *C01B 33/10763* (2013.01); *B01J 2523/00* (2013.01)

(56) References Cited

U.S. PATENT DOCUMENTS

| | | | |
|---|---|---|---|
| 6,768,018 B2 * | 7/2004 | Furuya | ...................... C07F 7/16 556/472 |
| 2005/0074387 A1 * | 4/2005 | Bulan | ...................... C01B 33/03 423/342 |
| 2013/0156676 A1 * | 6/2013 | Katsoulis | ............. B01J 23/8926 423/342 |
| 2014/0322121 A1 * | 10/2014 | Dassel | ...................... B01J 23/26 423/342 |

FOREIGN PATENT DOCUMENTS

| KR | 1020040045346 | 10/2009 |
|---|---|---|
| KR | 1020100090842 | 4/2012 |
| KR | 1020130105160 | 5/2014 |

* cited by examiner

METHOD FOR SURFACE-MODIFYING METAL SILICIDE, AND METHOD AND APPARATUS FOR PREPARING TRICHLOROSILANE USING SURFACE-MODIFIED METAL SILICIDE

TECHNICAL FIELD

The present invention relates to a method for surface-modifying metal silicide which may be used as a catalyst when preparing trichlorosilane. Further, the present invention relates to a method for preparing trichlorosilane by using surface-modified metal silicide. Furthermore, the present invention relates to an apparatus for preparing trichlorosilane by using surface-modified metal silicide.

BACKGROUND ART

Trichlorosilane is frequently used as raw gas for preparing polysilicon which is a raw material of wafers of semiconductors for electronic products and solar cells. Further, the trichlorosilane is a chemical material having high commercial utilization such as being used even in preparation of fine chemical gases or compounds containing a silicon element such as monosilane (MS; $SiH_4$).

In order to prepare the trichlorosilane, in a fluidized bed reactor, a mixing type reactor, or a fixed bed reactor, a method for reacting metal grade silicon (MG-Si) having purity of approximately 98 to 99% and hydrogen chloride (HCl) has been frequently used. However, in the case of using the method, there are problems in that a large amount of silicon tetrachloride is generated as byproducts and even in a precipitation process of preparing polysilicon using the trichlorosilane, a large amount of silicon tetrachloride is generated as byproducts.

In order to solve the problems, the silicon tetrachloride generated as the byproducts is converted into the trichlorosilane, and thus, reused, and eventually, research and development for improving the yield of the trichlorosilane have been actively conducted.

In order to convert the silicon tetrachloride into the trichlorosilane, generally, a process of hydrogen addition reaction (STC hydrogenation: $SiCl_4+H_2 \rightarrow SiHCl_3+HCl$) in which the trichlorosilane is obtained by adding hydrogen to the silicon tetrachloride and then reacting them under a normal pressure condition and a temperature condition of 800 to 950° C. has been used. Recently, a process of STC hydrochlorination (MG-Si+$3SiCl_4$+$2H_2 \rightarrow 4SiHCl_3$) which is performed under the pressure condition of tens bars or more and the temperature condition of 500 to 700° C. has been frequently used. In the STC hydrochlorination process, exceptively, in some cases, a transition metal such as copper may be added as a catalyst. However, in the conversion process of the silicon tetrachloride, there are problems in that a reaction condition is difficult, power consumption is large, and undesired chlorosilane gas is generated to reduce the yield of the trichlorosilane. Further, there is a problem in that the silicon tetrachloride is in contact with air or water to generate silicon oxide and hydrogen chloride gas and thus wastes that cause environmental pollution are mass-produced. Further, in the process of converting the silicon tetrachloride into the trichlorosilane, the trichlorosilane as the product may be contaminated by a catalyst component and a metal impurity contained in the metal grade silicon, and as a result, there is a problem in that an additional purifying process is required and the trichlorosilane may not be obtained with high yield.

In order to solve the problems, various processing techniques for preparing the trichlorosilane from the silicon tetrachloride have been proposed.

For example, in U.S. Pat. No. 7,754,175 (Prior Art 1) or U.S. Pat. No. 7,056,484 (Prior Art 2), techniques of reacting metal grade silicon and hydrogen chloride (HCl) or reacting metal grade silicon with silicon tetrachloride, hydrogen, and hydrogen chloride are disclosed. In Prior Art 2, it is mentioned that it is important to reduce a particle size to a predetermined level or less by simultaneously grinding the metal grade silicon and the copper catalyst.

Further, in U.S. Pat. No. 8,197,784 (Prior Art 3), a technique of reacting silicon tetrachloride and hydrogen under a condition of 900 to 1,300° C. and 19 to 24 atm to obtain the trichlorosilane with high yield is disclosed. In Prior Art 3, it is disclosed that it is important that a ratio of silicon tetrachloride and hydrogen is adjusted in the range of 1:1 to 1:100.

Further, in US Patent Publication No. 2004/0022713 (Prior Art 4), a technique of reacting metal grade silicon with hydrogen and silicon tetrachloride in the presence of a catalyst or selectively adding thereto and reacting them with hydrogen chloride (HCl) is disclosed. In Prior Art 4, it is mentioned that it is important to maintain the size of the catalyst (copper oxide, copper halogenide, iron powder, iron halogenide) at the level of 1/30 to 1/100 as compared with the size of the metal grade silicon.

Further, in U.S. Pat. No. 7,462,341 (Prior Art 5), a technique of reacting metal grade silicon containing chrome with hydrogen chloride (HCl) under the conditions of 250 to 1,100° C. and 5 to 30 atm is disclosed. In Prior Art 5, particularly, it is disclosed that it is important that chrome is included in the metal grade silicon at a concentration of 30 to 10,000 ppm.

Further, in U.S. Pat. No. 5,871,705 (Prior Art 6), a technique of introducing at least one silane selected from dichlorosilane (DCS; $SiH_2Cl_2$), monochlorosilane (MCS; $SiH_3Cl$), and monosilane to a reaction process of metal grade silicon and hydrogen chloride (HCl) is disclosed. In Prior Art 6, it is disclosed that it is important that an alkali metal compound is present together in the reaction of the metal grade silicon and the hydrogen chloride (HCl).

Meanwhile, in Japanese Patent Publication No. 1981-073617 (Prior Art 6), a technique of using copper power as a catalyst and reacting metal grade silicon, silicon tetrachloride, and hydrogen together at a reaction temperature of 350 to 600° C. to prepare trichlorosilane is disclosed. Further, in Japanese Patent Publication No. 1983-011042 (Prior Art 7), a technique of using copper chloride (CuCl) instead of copper power as a catalyst and reacting metal grade silicon, silicon tetrachloride, and hydrogen together to prepare trichlorosilane is disclosed. However, in the process of preparing the trichlorosilane, the catalyst such as copper (Cu) powder or copper chloride (CuCl) reduces the yield of the trichlorosilane due to a property of aggregation between the catalysts.

Further, in Japanese Patent Publication No. 1998-029813 (Prior Art 8), in order to solve a phenomenon in which catalysts such as copper (Cu) powder or copper chloride (CuCl) are aggregated with each other and enhance the yield of the trichlorosilane, a technique of using a copper silicide catalyst during STC hydrochlorination is disclosed. However, in Prior Art 8, there is a problem in that a silicon component included in the catalysts as well as the metal grade silicon participates in the trichlorosilane generating reaction. In addition, in the reaction process disclosed in Prior Art 8, while the catalyst supplied together with the metal grade silicon is fluidized, since the catalyst is discharged from the reactor in a chloride form together with the reaction product, there is a problem in that the catalyst needs to be continuously supplied and process operating cost for removing the catalyst from the reaction product after reaction is additionally generated. Further, even though the catalyst remains in the reactor, there is a problem in that in order to maintain a proper catalyst amount, the catalyst needs to be continuously supplied.

DISCLOSURE

Technical Problem

An object of the present invention is to provide a method for surface-modifying metal silicide which is used as a catalyst in STC hydrochlorination for preparing trichlorosilane to improve the yield of trichlorosilane or give an economical advantage on a process operation.

Another object of the present invention is to provide a method for efficiently preparing trichlorosilane by using surface-modified metal silicide.

Yet another object of the present invention is to provide an apparatus for implementing simultaneously the method for surface-modifying the metal silicide and the method for preparing the trichlorosilane by using the surface-modified metal silicide.

Technical Solution

An aspect of the present invention provides a method for surface-modifying metal silicide comprising, the steps of: supplying silicon tetrachloride and inert gas in a modification reaction unit filled with metal silicide; modifying the surface of the metal silicide by heating the modification reaction unit to which the silicon tetrachloride and the inert gas are supplied; and cooling the surface-modified metal silicide while flowing the inert gas in the heated modification reaction unit.

The metal silicide may include copper (Cu), aluminum (Al), and iron (Fe) as metal components. The content of aluminum (Al) in the metal silicide may be 0.2 wt % or more to 0.76 wt % or less. The content of iron (Fe) may be 0.1 wt % or more to 0.24 wt % or less. A molar ratio of silicon (Si) and copper (Cu) which are present on the surface of the metal silicide may have a range of 1 or more to 30 or less after the surface modification.

The metal silicide may include nickel (Ni), aluminum (Al), and iron (Fe) as metal components. The content of aluminum (Al) in the metal silicide may be 0.16 wt % or more to 0.61 wt % or less. The content of iron (Fe) may be 0.04 wt % or more to 0.39 wt % or less. A molar ratio of silicon (Si) and nickel (Ni) which are present on the surface of the metal silicide may have a range of 1 or more to 40 or less after the surface modification.

The silicon tetrachloride and the inert gas may be supplied to the modification reaction unit with a molar ratio in a range of 1:1 to 1:10.

Another aspect of the present invention provides a method for preparing trichlorosilane comprising: supplying surface-modified metal silicide and metal grade silicon to a reaction unit; supplying silicon tetrachloride and hydrogen to the reaction unit; and supplying a product, which is generated by a reaction of the metal grade silicon, the silicon tetrachloride, and the hydrogen in the presence of the metal silicide in the reaction unit, to a separation unit, and separating a trichlorosilane component. In this case, the surface-modified metal silicide is formed by a reaction of the metal silicide and the silicon tetrachloride in an inert gas atmosphere.

The metal silicide may include at least one selected from copper (Cu) and nickel (Ni) and at least one selected from aluminum (Al) and iron (Fe) as the metal component.

The metal grade silicon may be repetitively supplied to the reaction unit at a time interval.

The pressure of the reaction unit may be set to a range of 1 atm or more to 50 atm or less.

The temperature of the reaction unit may be set to a range of 300° C. or more to 1,000° C. or less.

The method for preparing the trichlorosilane may further include recirculating the remaining components except for the trichlorosilane of the product from the separation unit to the reaction unit.

Yet another aspect of the present invention provides an apparatus for preparing trichlorosilane including a modification reaction unit in which while metal silicide is charged and inert gas and silicon tetrachloride are supplied onto the metal silicide, a surface-modification reaction of the metal silicide occurs; a reaction unit which is connected to the modification reaction unit to generates trichlorosilane while the surface-modified metal silicide flows into the reaction unit and metal grad silicon, hydrogen, and the silicon tetrachloride are supplied on to the surface-modified metal silicide; and a separation unit which is connected to the reaction unit to receive the product generated in the reaction unit and separate a trichlorosilane component from the product.

The apparatus for preparing the trichlorosilane may further include a storage unit which temporarily stores the trichlorosilane separated from the separation unit.

The separation unit may further include a first processing pipe which transfers the trichlorosilane separated from the product to the storage unit and a second processing pipe which recirculates the remaining components except for the trichlorosilane of the product to the reaction unit.

The metal silicide may include at least one selected from copper (Cu) and nickel (Ni) and at least one selected from aluminum (Al) and iron (Fe) as the metal component.

The reaction unit may be formed by at least one selected from a fixed bed reactor, a mixing type reactor, and a fluidized bed reactor.

Advantageous Effects

In the case where a silicon tetrachloride hydrochlorination reaction is performed by using the method for surface-modifying the metal silicide, and the method and the apparatus for preparing the trichlorosilane according to the embodiment of the present invention, the yield of trichlorosilane can be raised.

Further, in the case where the metal silicide surface-modified by the present invention is used as a catalyst of the silicon tetrachloride hydrochlorination reaction, even though the metal silicide catalyst is not continuously supplied to the reaction unit, the trichlorosilane can be continuously obtained.

Further, in the case where the silicon tetrachloride hydrochlorination reaction is performed by using the method and the apparatus for preparing the trichlorosilane, a processing condition is easily fitted and generation of silicon tetrachloride as a byproduct is suppressed to reduce the waste disposal costs.

Effects of the method for surface-modifying the metal silicide, and the method and the apparatus for preparing the trichlorosilane according to the embodiment of the present invention are not limited to the aforementioned effects and other unmentioned effects can be clearly understood to those skilled in the art from the disclosure of claims.

DESCRIPTION OF DRAWINGS

The "STC" illustrated in FIGS. 1 to 3 means silicon tetrachloride. Further, the "TCS" illustrated in FIGS. 2 and 3 means trichlorosilane.

MODE FOR THE INVENTION

Hereinafter, some exemplary embodiments of the present invention will be described in detail with reference to the accompanying drawings. However, the accompanying drawings are only to more easily disclose the contents according to embodiments of the present invention, and it can be easily understood to those skilled in the art that the scope of the present invention is not limited to the scope of the accompanying drawings.

Further, in the description of the embodiments of the present invention, constituent elements having like functions just use like names and like reference numerals, and it is said that the present invention is not substantially completely the same as a method for surface-modifying metal silicide, a method and an apparatus for preparing trichlorosilane using surface-modified metal silicide in the related art.

Further, the terms used for describing the embodiments of the present invention are just used for describing a specific embodiment, but not used to intend to limit the scope of the present invention. Singular expressions used herein include plurals expressions unless they have definitely opposite meanings. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations, in advance.

Further, in the drawings, thicknesses or sizes of respective layers are exaggerated or omitted for convenience of description and clarity or schematically illustrated, and actual sizes of respective constituent elements are not completely reflected.

<Method of Surface-Modifying Metal Silicide>

Figure 1:
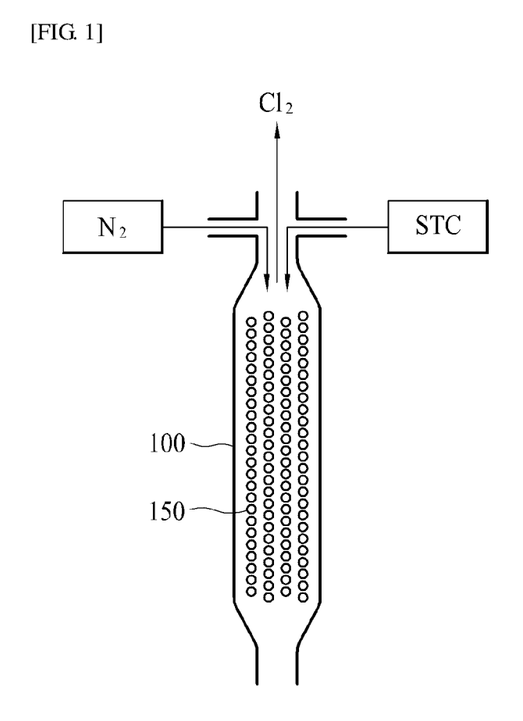
FIG. 1 is a concept diagram for describing a method for surface-modifying a metal silicide catalyst according to an embodiment of the present invention.

One aspect of the present invention relates to a method for surface-modifying metal silicide. FIG. 1 is a concept diagram for describing a method for surface-modifying a metal silicide catalyst according to an embodiment of the present invention. As illustrated in FIG. 1, in order to modify the surface of the metal silicide catalyst, first, a metal silicide catalyst 150 is charged in a reaction unit 100. A metal configuring the metal silicide catalyst 150 may be selected from transition metals or noble metals. The transition metal or the noble metal has a feature to facilitate hydrogenation reaction and stably maintain a catalyst phase. In addition, silicide configuring the metal silicide catalyst 150 serves as a carrier. That is, the silicide serves as a storage which stores the metal as an active component of the catalyst and serves to enlarge the surface area of the catalyst and facilitate the handling of the catalyst.

The method for surface-modifying the metal silicide according to the embodiment of the present invention will be described for each active component of the catalyst.

(1) Method of Surface-Modifying Metal Silicide Containing Copper as Active Component In the method for surface-modifying the metal silicide according to the embodiment of the present invention, the metal silicide catalyst 150 includes copper (Cu) as the active metal component, and preferably, further may include aluminum (Al) or iron (Fe). In this case, the size of the metal silicide catalyst 150 ($Cu_5Si$, Al, and Fe) may have a range of 100 μm or more to 450 μm or less.

Meanwhile, aluminum (Al) and iron (Fe) included in the metal silicide catalyst serves to further facilitate the surface-modification reaction of the metal silicide catalyst 150. In the metal silicide catalyst, the content of aluminum (Al) may be controlled in a range of 0.2 wt % or more to 0.76 wt % or less and the content of iron (Fe) may be controlled in a range of 0.1 wt % or more to 0.24 wt % or less. When the content of aluminum (Al) is 0.2 wt % or more in the metal silicide catalyst, aluminum (Al) may plays a catalytic role in the surface modification reaction of the metal silicide catalyst 150 to further facilitate the surface modification reaction of the metal silicide catalyst 150. Further, when the content of aluminum (Al) is 0.76 wt % or less in the metal silicide catalyst, aluminum (Al) as a reactive metal does not react with chloride gas ($Cl_2$) present at the time of the surface-modification reaction of the metal silicide catalyst 150 to physically and chemically stably maintain the catalyst phase. Similarly, when the content of iron (Fe) is 0.1 wt % or more in the metal silicide catalyst, iron (Fe) plays a catalytic role in the surface modification reaction of the metal silicide catalyst 150 to further facilitate the surface modification reaction of the metal silicide catalyst 150. Further, when the content of iron (Fe) is 0.24 wt % or less in the metal silicide catalyst, iron (Fe) as a reactive metal does not react with chloride gas ($Cl_2$) present at the time of the surface-modification reaction of the metal silicide catalyst 150 to physically and chemically stably maintain the catalyst phase.

Thereafter, while the silicon tetrachloride (STC) and inert gas are supplied into the modification reaction unit 100 which is charged with the metal silicide catalyst 150 with a predetermined molar ratio (for example, 1:1 to 1:10), the reaction unit 100 is heated. In this case, the inert gas may be at least one selected from a group consisting of helium, neon, argon, krypton, xenon, radon, nitrogen, and carbon dioxide. Hereinafter, the embodiment of the present invention will be described to be limited to a case where the STC and nitrogen gas ($N_2$) are supplied with a molar ratio of 1:1.

The STC and the nitrogen gas ($N_2$), which are supplied onto the metal silicide catalyst 150 in the modification reaction unit 100, may modify the surface of the metal silicide catalyst 150 through a reaction represented by the following Reaction Formula 1 as the modification reaction unit 100 is heated. $Cl_2$ generated in the following Reaction Formula 1 is deactivated to be discharged to the outside of the modification reaction unit 100.

$$Cu_5Si+xSiCl_4 \rightarrow Cu_5Si(1+x)+2xCl_2 \quad \text{[Reaction Formula 1]}$$

The following Table 1 lists a molar ratio of silicon (Si) and copper (Cu) according to a reaction time when the surface of the metal silicide catalyst containing copper as an active component is modified through the method illustrated in FIG. 1. In detail, while the temperature in the modification reaction unit 100 is heated up to 700° C., the STC and the nitrogen gas ($N_2$) react with each other on the metal silicide catalyst 150, and then a molar ratio of silicon (Si) and copper (Cu) on the surface of the metal silicide catalyst 50 according to a reaction time is analyzed by an X-ray photoelectron spectroscopy (XPS).

TABLE 1

|  | Experimental Example of surface modification/classification | | | |
| --- | --- | --- | --- | --- |
|  | Experimental Example 1 | Experimental Example 2 | Experimental Example 3 | Experimental Example 4 |
| Reaction time (hr) | 0 | 1 | 4 | 20 |
| Si/Cu atomic ratio | 0.23 | 4.40 | 12.30 | 30.10 |

Like Experimental Example 2 and Experimental Example 3 in Table 1, when a molar ratio of silicon (Si) and copper (Cu) on the surface of the metal silicide catalyst 150 is adjusted to 1 or more to 30 or less by the surface modification, the activity of the metal silicide catalyst is improved to facilitate a reaction of preparing trichlorosilane (TCS) to be described below. In addition, the metal silicide catalyst itself does not act as the reactant during the TSC preparation reaction not to be discharged to the outside of the reaction unit together with the reaction product. For this reason, in the case of using the surface-modified metal silicide catalyst of the present invention, the production yield of the TCS to be described below may be improved and simultaneously, the metal silicide catalyst needs not to be continuously supplied separately during the process of preparing the TCS.

Accordingly, the molar ratio of silicon (Si) and copper (Cu) on the surface of the metal silicide catalyst 150 may be adjusted to 1 or more to 30 or less, preferably 2 or more to 20 or less, and more preferably 3 or more to 15 or less.

After the surface modification reaction is finished, while the nitrogen gas ($N_2$) flows into the modification reaction unit, the metal silicide catalyst is cooled at room temperature to finally prepare the surface-modified metal silicide catalyst.

(2) Method of Surface-Modifying Metal Silicide Containing Nickel as Active Component In the method for surface-modifying the metal silicide according to the embodiment of the present invention, the metal silicide catalyst 150 includes nickel (Ni) as the active metal component, and preferably may further include aluminum (Al) or iron (Fe). In this case, the size of the metal silicide catalyst 150 ($Ni_2Si$, Al, and Fe) may have a range of 100 μm or more to 450 μm or less.

Meanwhile, aluminum (Al) and iron (Fe) included in the metal silicide catalyst serves to further facilitate the surface-modification reaction of the metal silicide catalyst 150. In the metal silicide catalyst, the content of aluminum (Al) may be adjusted in a range of 0.16 wt % or more to 0.61 wt % or less and the content of iron (Fe) may be adjusted in a range of 0.04 wt % or more to 0.39 wt % or less. When the content of aluminum (Al) is equal to or greater than 0.16 wt % in the metal silicide catalyst, aluminum (Al) may perform a catalytic function in the surface modification reaction of the metal silicide catalyst 150 to further facilitate the surface modification reaction of the metal silicide catalyst 150.

Further, when the content of aluminum (Al) is equal to or less than 0.61 wt % or more in the metal silicide catalyst, aluminum (Al) as a reactive metal does not react with chloride gas ($Cl_2$) present at the time of the surface-modification reaction of the metal silicide catalyst 150 to physically and chemically stably maintain the catalyst phase. Similarly, when the content of iron (Fe) is equal to or greater than 0.04 wt % in the metal silicide catalyst, iron (Fe) plays a catalytic role in the surface modification reaction of the metal silicide catalyst 150 to further facilitate the surface modification reaction of the metal silicide catalyst 150. Further, when the content of iron (Fe) is equal to or less than 0.39 wt % in the metal silicide catalyst, iron (Fe) as a reactive metal does not react with chloride gas ($Cl_2$) present at the time of the surface-modification reaction of the metal silicide catalyst 150 to physically and chemically stably maintain the catalyst phase.

Thereafter, while the STC and the inert gas are supplied into the modification reaction unit 100 which is charged with the metal silicide catalyst 150 with a predetermined molar ratio (for example, 1:1 to 1:10), the modification reaction unit 100 is heated. In this case, the inert gas may be at least one selected from a group consisting of helium, neon, argon, krypton, xenon, radon, nitrogen, and carbon dioxide. Hereinafter, another embodiment of the present invention will be described to be limited to a case where the STC and nitrogen gas ($N_2$) are supplied with a molar ratio of 1:1.

The STC and the nitrogen gas ($N_2$) which are supplied onto the metal silicide catalyst 150 in the modification reaction unit 100 may modify the surface of the metal silicide catalyst 150 through the same reaction as the following Reaction Formula 2 as the modification reaction unit 100 is heated. $Cl_2$ generated in the following Reaction Formula 2 is deactivated to be discharged to the outside of the modification reaction unit 100.

$$Ni_2Si+xSiCl_4 \rightarrow Ni_2Si(1+x)+2xCl_2 \quad \text{[Reaction Formula 2]}$$

The following Table 2 lists a molar ratio of silicon (Si) and nickel (Ni) according to a reaction time when the surface of the metal silicide catalyst containing nickel as an active component is modified through the method illustrated in FIG. 1. In detail, while the temperature in the modification reaction unit 100 is heated up to 700° C., the STC and the nitrogen gas ($N_2$) react with each other on the metal silicide catalyst 150, and then a molar ratio of silicon (Si) and nickel (Ni) on the surface of the metal silicide catalyst 150 according to a reaction time is analyzed by an X-ray photoelectron spectroscopy (XPS).

TABLE 2

|  | Experimental Example of surface modification/classification | | | |
| --- | --- | --- | --- | --- |
|  | Experimental Example 5 | Experimental Example 6 | Experimental Example 7 | Experimental Example 8 |
| Reaction time (hr) | 0 | 1 | 4 | 20 |
| Si/Ni atomic ratio | 0.53 | 3.8 | 17.7 | 49.8 |

Like Experimental Examples 6 and 7 in Table 2, when the molar ratio of silicon (Si) and nickel (Ni) on the surface of the metal silicide catalyst 150 is adjusted to 1 or more to 40 or less by the surface modification, the activity of the metal silicide catalyst is improved to facilitate a reaction of preparing trichlorosilane (TCS) to be described below. In addition, the metal silicide catalyst itself does not act as the reactant during the TSC preparation reaction not to be discharged to the outside of the reaction unit together with the reaction product. For this reason, in the case of using the surface-modified metal silicide catalyst of the present invention, the production yield of the TCS to be described below may be improved and simultaneously, the metal silicide catalyst needs not to be continuously supplied separately during the process of preparing the TCS.

Accordingly, according to the surface modification method according to the present invention, the molar ratio of silicon (Si) and nickel (Ni) on the surface of the metal silicide catalyst 150 may be adjusted to 1 or more to 40 or less, preferably 2 or more to 30 or less, and more preferably 3 or more to 20 or less.

After the surface modification reaction is finished, while the nitrogen gas ($N_2$) flows into the modification reaction unit, the metal silicide catalyst is cooled at room temperature to finally prepare the surface-modified metal silicide catalyst.

<Method of Preparing Trichlorosilane Using Surface-Modified Metal Silicide>

Figure 2:
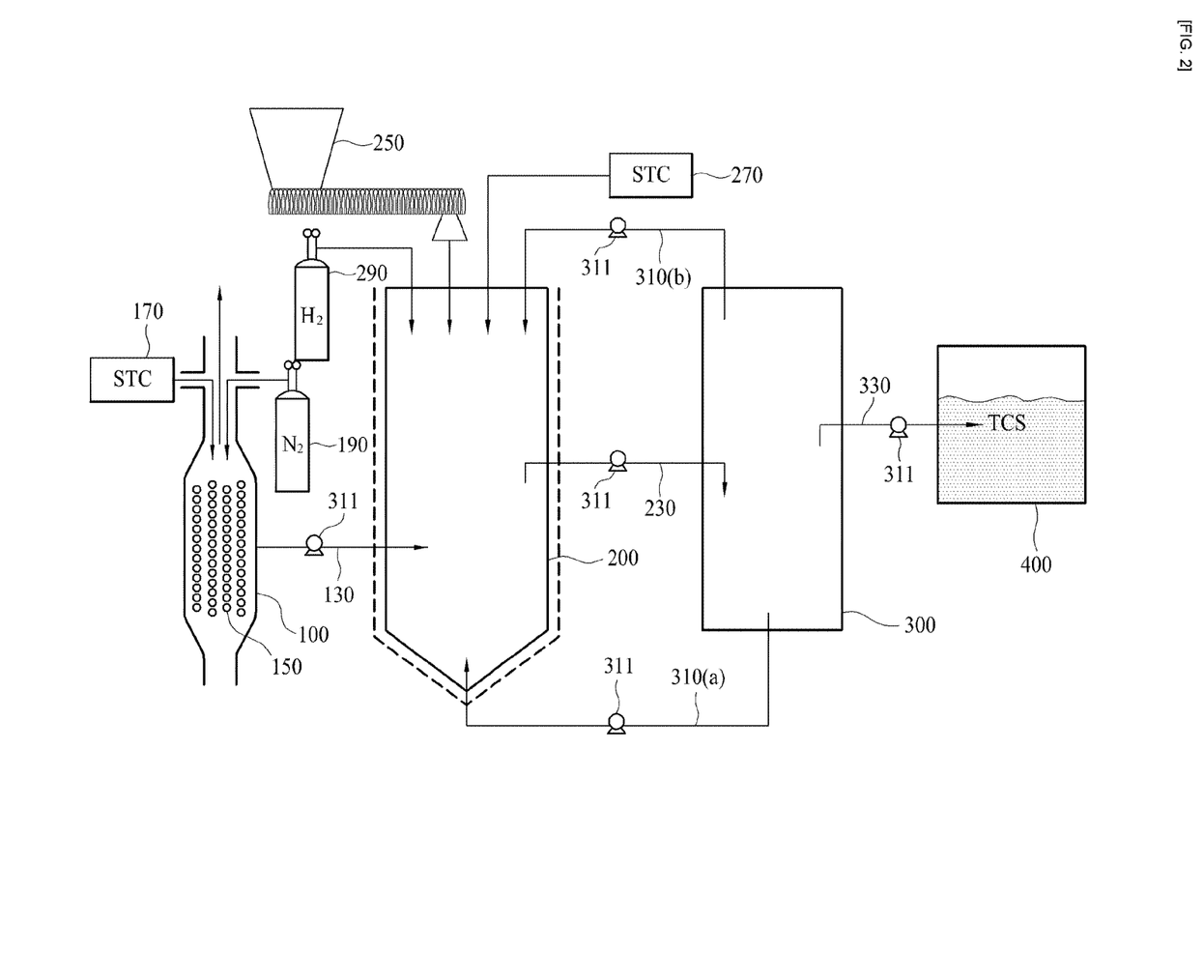
FIG. 2 is a concept diagram for describing an apparatus for preparing trichlorosilane using a surface-modified metal silicide catalyst according to another embodiment of the present invention.
Figure 3:
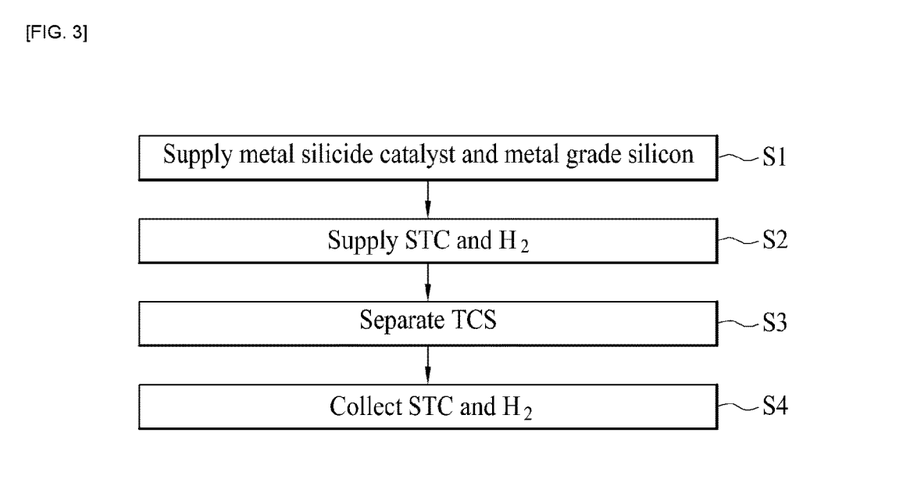
FIG. 3 is a concept diagram for describing a method for preparing trichlorosilane using a surface-modified metal silicide catalyst according to another embodiment of the present invention.

Another aspect of the present invention relates to a method for preparing trichlorosilane (TCS) by using surface-modified metal silicide. FIG. 2 is a concept diagram for describing an apparatus for preparing trichlorosilane using a surface-modified metal silicide catalyst according to another embodiment of the present invention and FIG. 3 is a concept diagram for describing a method for preparing trichlorosilane using a surface-modified metal silicide catalyst according to another embodiment of the present invention. Hereinafter, a method for preparing trichlorosilane according to another embodiment of the present invention will be described with reference to FIGS. 2 and 3.

As illustrated in FIGS. 2 and 3, in order to prepare trichlorosilane (TCS), first, a surface-modified metal silicide catalyst 150 and metal grade silicon (MG-Si) 250 is supplied to a reaction unit 200 with a predetermined mass ratio, for example, a mass ratio of 1:2 (51). In this case, the concentration of the surface-modified metal silicide catalyst 150 is adjusted to a range of 5 wt % or more to 50 wt % or less based on the entire weight of the solid phase in the reaction unit 200 to ensure economic efficiency and simultaneously increase the yield of the TCS. Further, a metal component configuring the surface-modified metal silicide catalyst 150 may include copper (Cu), aluminum (Al) and iron (Fe) or nickel (Ni), aluminum (Al) and iron (Fe) as described above. The term "metal grade silicon" used in the present invention is silicon having the purity of approximately 98% or more (for example, 98 to 99%) and is generally prepared in quantity by a thermal carbon reduction method for silica. In the method for preparing the trichlorosilane according to the embodiment of the present invention, the metal grade silicon may be continuously supplied to the reaction unit and repetitively supplied at a time interval.

Thereafter, hydrogen ($H_2$) and silicon tetrachloride (STC) are supplied into the reaction unit 200 in which the surface-modified metal silicide catalyst 150 and the metal grade silicon 250 are mixed and then reaction among the MG-Si, the STC, and the hydrogen ($H_2$) occurs in the reaction unit 200 (S2). In this case, a supply molar ratio of the hydrogen ($H_2$) and the STC is adjusted to a range of 1 or more to 10 or less to ensure economic efficiency and simultaneously increase the yield of the TCS.

Meanwhile, the STC and the hydrogen ($H_2$), which are supplied onto the surface-modified metal silicide catalyst 150 and the metal silicon 250 in the reaction unit 200, may be converted into trichlorosilane (TCS) by a reaction represented by the following Reaction Formula 3.

$$MG\text{-}Si + 3SiCl_4 + 2H_2 \rightarrow 4SiHCl_3 \qquad \text{[Reaction Formula 3]}$$

In the method for preparing the TCS according to the embodiment of the present invention, the pressure of the reaction unit 200 may be set in a range of 1 atm or more to 50 atm or less. When the pressure of the reaction unit is equal to or greater than 1 atm, the STC injected within the given temperature range is not vaporized, and when the pressure of the reaction unit is equal to or less than 50 atm, energy for maintaining the pressure is not excessively used and thus energy efficiency on the processing is not deteriorated. Further, in the method for preparing the TCS according to the embodiment of the present invention, the reaction unit 200 may be heated (210) in a range of 300° C. or more to 1,000° C. or less. When the temperature of the reaction unit 200 rises up to 300° C. or more, the energy required for a TCS generation reaction is not lacked and thus the TCS generation reaction may smoothly occur. When the temperature of the reaction unit 200 is maintained at 1,000° C. or less, the energy required for the TCS generation reaction is not excessively used and thus the energy efficiency in the process for producing the TCS is not deteriorated.

The following Tables 3 and 4 list the yield of the TCS when preparing the TCS by using the surface-modified metal silicide catalyst. In Preparation Example of the TCS listed in Tables 3 and 4, the temperature of the reaction unit 200 of 525° C., the pressure of the reaction unit of 300 psi, the reaction time of 500 min, the weight hourly space velocity (WHSV) of the STC of 8.9/h, and the molar ratio of $H_2$:STC of 2.05 were set. Further, the yield of the TCS was analyzed by inductively coupled plasma (ICP).

TABLE 3

| | Preparation Example of TCS/Classification | | | | |
|---|---|---|---|---|---|
| | Preparation Example 1 | Preparation Example 2 | Preparation Example 3 | Preparation Example 4 | Comparative Preparation Example 1 |
| Type of used metal silicide catalyst | Experimental Example 1 | Experimental Example 2 | Experimental Example 3 | Experimental Example 4 | — |
| Yield of TCS (mol %) | 29.2 | 36.5 | 34.2 | 25.4 | 20.3 |

TABLE 4

| | Preparation Example of TCS/Classification | | | | |
|---|---|---|---|---|---|
| | Preparation Example 5 | Preparation Example 6 | Preparation Example 7 | Preparation Example 8 | Comparative Preparation Example 1 |
| Type of used metal silicide catalyst | Experimental Example 5 | Experimental Example 6 | Experimental Example 7 | Experimental Example 8 | — |
| Yield of TCS (mol %) | 31.8 | 38.5 | 33.9 | 23.7 | 20.3 |

In Table 3, Preparation Example 1 represents a condition using the metal silicide catalyst when the molar ratio of silicon (Si) and copper (Cu) on the surface is less than 1, Preparation Examples 2 and 3 represent a condition using the metal silicide catalyst when the molar ratio of silicon (Si) and copper (Cu) on the surface is 1 or more to 30 or less, and Preparation Example 4 represents a condition using the metal silicide catalyst when the molar ratio of silicon (Si) and copper (Cu) on the surface is greater than 30. Further, in Table 5, Preparation Example 5 represents a condition using the metal silicide catalyst when the molar ratio of silicon (Si) and nickel (Ni) on the surface is less than 1, Preparation Examples 6 and 7 represent a condition using the metal silicide catalyst when the molar ratio of silicon (Si) and nickel (Ni) on the surface is 1 or more to 40 or less, and Preparation Example 4 represents a condition using the metal silicide catalyst when the molar ratio of silicon (Si) and nickel (Ni) on the surface is greater than 40. Further, in Tables 3 and 4, Comparative Preparation Example 1 represents a condition without using the metal silicide catalyst.

As listed in Table 3, as compared with Comparative Preparation Example 1 without using the metal silicide catalyst, in Preparation Examples 1 to 4 using the metal silicide catalyst containing copper as an active component, the yields of the TCS are higher. Further, as compared with Preparation Example 1 using the metal silicide catalyst before the surface is modified, in Preparation Examples 2 and 3 using the metal silicide catalyst in which the surface is modified, the yields of the TCS are higher. Meanwhile, as compared with Preparation Examples 1 and 4 using the metal silicide catalyst when the molar ratio of silicon (Si) and copper (Cu) on the surface is less than 1 or greater than 30, in Preparation Examples 2 and 3 using the metal silicide catalyst when the molar ratio of silicon (Si) and copper (Cu) on the surface has a range of 1 or more to 30 or less, the yields of the TCS are higher.

Further, as listed in Table 4, as compared with Comparative Preparation Example 1 without using the metal silicide catalyst, in Preparation Examples 5 to 8 using the metal silicide catalyst containing nickel as an active component, the yields of the TCS are higher. Further, as compared with Preparation Example 5 using the metal silicide catalyst before the surface is modified, in Preparation Examples 6 and 7 using the metal silicide catalyst in which the surface is modified, the yields of the TCS are higher. Meanwhile, as compared with Preparation Examples 5 and 8 using the metal silicide catalyst when the molar ratio of silicon (Si) and nickel (Ni) on the surface is less than 1 or greater than 40, in Preparation Examples 6 and 7 using the metal silicide catalyst when the molar ratio of silicon (Si) and nickel (Ni) on the surface has a range of 1 or more to 40 or less, the yields of the TCS are higher.

Further, the TCS is prepared by using the surface-modified metal silicide catalyst under the conditions of Preparation Examples 1 to 8, a bulk composition of the metal silicide catalyst after the reaction is completed was analyzed by an inductively coupled plasma (ICP), and the results thereof are listed in Table 5 and 6.

TABLE 5

| | Preparation Example of TCS/Classification | | | |
|---|---|---|---|---|
| | Preparation Example 1 | Preparation Example 2 | Preparation Example 3 | Preparation Example 4 |
| Type of used metal silicide catalyst | Experimental Example 1 | Experimental Example 2 | Experimental Example 3 | Experimental Example 4 |
| Si/Cu bulk ratio in catalyst after completion of reaction | 0.025 | 0.21 | 0.19 | 0.22 |

TABLE 6

| | Preparation Example of TCS/Classification | | | |
|---|---|---|---|---|
| | Preparation Example 5 | Preparation Example 6 | Preparation Example 7 | Preparation Example 8 |
| Type of used metal silicide catalyst | Experimental Example 5 | Experimental Example 6 | Experimental Example 7 | Experimental Example 8 |
| Si/Ni bulk ratio in catalyst after completion of reaction | 0.012 | 0.54 | 0.52 | 0.48 |

As listed in Table 5, it can be seen that in surface-modified metal silicide catalysts containing copper as an active component, a bulk composition ratio of silicon (Si) and nickel (Ni) in the catalyst during the process of preparing the TCS is almost uniformly maintained. As listed in Table 6, it can be seen that in the process of preparing the TCS using the surface-modified metal silicide catalysts containing nickel as an active component, a bulk ratio of silicon (Si) and nickel (Ni) in the catalyst is almost uniformly maintained. That is, the metal silicide catalyst with the modified surface does not participate as the reactant in the TCS preparation reaction, but serves as the catalyst, and thus the metal silicide catalyst is not discharged to the outside of the reaction unit 200 together with the reaction product. Accordingly, in the case of using the surface-modified metal silicide catalyst, while the process for preparing the TCS is performed, even though the metal silicide catalyst is not separately added, the trichlorosilane may be continuously obtained. In addition, the amount of the byproduct in the reaction product is minimized and thus the present invention may have economic advantages on the operational process in the process for purifying the trichlorosilane as the reaction product.

Meanwhile, the reaction product generated by a reaction among the MG-Si, the STC, and the hydrogen ($H_2$) in the reaction unit 200 is supplied to the separation unit 300 and the TCS and the remaining components except for the TCS are separated from the reaction product in the separation unit by filtration and the like (S3). The remaining components except for the TCS in the reaction product are mainly constituted by the STC and the hydrogen ($H_2$).

Thereafter, the TCS separated in the separation unit 300 is transferred to a TCS storage unit 400 and temporarily stored in the storage unit 400. The temporarily stored TCS may be used as raw gas and the like for preparing polysilicon which is a raw material of a silicon wafer used in semiconductors for electronic products and photovoltaic solar cells.

Further, the remaining components in which the TCS is removed may be recirculated to the reaction unit 200 (S4). When the remaining components in which the TCS is removed from the reaction product are recirculated and used as the reactant again, a large amount of STC byproducts may be suppressed and waste disposal cost may be reduced.

<Apparatus of Preparing Trichlorosilane Using Surface-Modified Metal Silicide>

Another aspect of the present invention relates to an apparatus for preparing trichlorosilane (TCS) by using surface-modified metal silicide. As illustrated in FIG. 2, the apparatus for preparing the TCS according to the embodiment of the present invention includes a modification reaction unit 100, a reaction unit 200, and a separation unit 300, and preferably, may further include a storage unit 400.

In the modification reaction unit 100, the metal silicide catalyst 150 is charged and inert gas 190 and silicon tetrachloride (STC) 170 are supplied into the metal silicide catalyst 150, and thus, a reaction for modify the surface of the metal silicide catalyst 150 may occur. In this case, the inert gas 190 may be one selected from a group consisting of helium, neon, argon, krypton, xenon, radon, nitrogen, and carbon dioxide, and in the embodiment of the present invention, the inert gas will be described to be limited to nitrogen gas ($N_2$). In addition, the modification reaction unit 100 is preferably formed by a tube structure made of hastelloy. In this case, the modification reaction unit 100 may withstand even high gas pressure generated by the surface modification reaction of the metal silicide catalyst 150 and is not corroded even in the surface modification reaction of a large amount of metal silicide catalyst 150 to have high corrosion resistance. Meanwhile, after the surface is modified by the STC and nitrogen gas ($N_2$) 190, the metal silicide catalyst 150 may be transferred to the inside of the reaction unit 200 for preparing the TCS through a first pipe 130 with a pump 311.

The reaction unit 200 may be connected to the modification reaction unit 100 through the first pipe 130. In the present invention, the reaction unit 200 may be selected from a fixed bed reactor, a mixing type reactor, and a fluidized bed reactor and the reaction unit 200 according to the embodiment of the present invention is limited to the fluidized bed reactor. In addition, a heating device 210 and a pressure controller (not illustrated) may be provided on an outer wall of the reaction unit 200 to control the temperature and the pressure of the reaction unit 200. Meanwhile, in the reaction unit, in the presence of the surface-modified metal silicide catalyst 150 supplied to the reaction unit 200 through the first pipe 130, trichlorosilane (TCS) may be generated by a reaction among metal grade silicon 250, hydrogen ($H_2$) 290, and silicon tetrachloride 270.

The reaction product generated in the reaction unit 200 is transferred to the separation unit 300 through a second pipe 230 and the TCS and the remaining components except for the TCS of the product generated in the reaction unit 200 may be separated by filtration and the like in the separation unit 300. Further, the separation unit 300 may further include a first processing pipe 330 transferring the TCS to the storage unit 400 and a second processing pipe 310 retransferring the remaining components except for the TCS to the reaction unit 200. Further, the second processing pipe 310 may be constituted by a STC processing pipe 310a and a hydrogen processing pipe 310b which may retransfer the STC and the hydrogen which have different densities to the reaction unit 200, respectively. Meanwhile, the TCS transferred to the storage unit 400 through the first processing pipe 330 may be temporarily stored in the storage unit 400. In addition, the STC transferred to the reaction unit 200 through the second processing pipe 310 and unreacted hydrogen may be reused in the generation reaction of the TCS.

As such, the preferable embodiments of the present invention are described and the scope of the present invention is not limited to the embodiments described above and defined by those disclosed in claims. Further, it is apparent that those skilled in the art can make various modifications and adaptations within the scope disclosed in claims.

The invention claimed is:

1. A method for surface-modifying metal silicide, the method comprising:
   supplying silicon tetrachloride and inert gas to a modification reaction unit filled with metal silicide;
   modifying the surface of the metal silicide by heating the modification reaction unit to which the silicon tetrachloride and the inert gas are supplied; and
   cooling the surface-modified metal silicide while flowing the inert gas in the heated modification reaction unit,
   wherein the metal silicide is comprised of a copper (Cu) silicide or a nickel (Ni) silicide, the metal silicide optionally including an amount of iron (Fe).

2. The method for surface-modifying metal silicide of claim 1, wherein the inert gas is selected from the group consisting of helium, neon, argon, krypton, xenon, radon, nitrogen, carbon dioxide, and combinations thereof.

3. The method for surface-modifying metal silicide of claim 1, wherein the metal silicide is copper silicide and the content of iron (Fe) in the copper silicide is 0.1 wt % or more to 0.24 wt % or less.

4. The method for surface-modifying metal silicide of claim 2, wherein a molar ratio of silicon (Si) and copper (Cu) which are present on the surface of the metal silicide has a range of 1 or more to 30 or less after surface modification.

5. The method for surface-modifying metal silicide of claim 1, wherein the metal silicide is nickel silicide and the content of iron (Fe) in the nickel silicide is 0.04 wt % or more to 0.39 wt % or less.

6. The method for surface-modifying metal silicide of claim 1, wherein a molar ratio of silicon (Si) and nickel (Ni) which are present on the surface of the metal silicide has a range of 1 or more to 40 or less after surface modification.

7. The method for surface-modifying metal silicide of claim 1, wherein the silicon tetrachloride and the inert gas are supplied to the modification reaction unit with a molar ratio in a range of 1:1 to 1:10.

8. A method for preparing trichlorosilane, the method comprising:

supplying surface-modified metal silicide and metal grade silicon to a reaction unit;
supplying silicon tetrachloride and hydrogen to the reaction unit;
reacting the metal grade silicon, the silicon tetrachloride, and the hydrogen in the presence of the metal silicide in the reaction unit to form a product;
supplying the product to a separation unit; and
separating a trichlorosilane component from the product,
wherein the surface-modified metal silicide is formed by a reaction of a metal silicide and silicon tetrachloride in an inert gas atmosphere, and
wherein the metal silicide is comprised of a copper silicide or a nickel silicide, the metal silicide optionally including an amount of iron.

9. The method for preparing trichlorosilane of claim 8, wherein the inert gas is selected from the group consisting of helium, neon, argon, krypton, xenon, radon, nitrogen, carbon dioxide, and combinations thereof.

10. The method for preparing trichlorosilane of claim 8, wherein the metal grade silicon is repetitively supplied to the reaction unit at a time interval.

11. The method for preparing trichlorosilane of claim 8, wherein the pressure of the reaction unit is set to a range of 1 atm or more to 50 atm or less.

12. The method for preparing trichlorosilane of claim 8, wherein the temperature of the reaction unit is set to a range of 300° C. or more to 1,000° C. or less.

13. The method for preparing trichlorosilane of claim 8, the method further comprising: recirculating the remaining components except for the trichlorosilane of the product from the separation unit to the reaction unit.

* * * * *